United States Patent [19]

Yamamoto

[11] Patent Number: 4,542,589

[45] Date of Patent: Sep. 24, 1985

[54] TAPE MEASURE

[76] Inventor: Masakazu Yamamoto, 64-4, 3-chome, Tutumi-cho, Yao-shi, Osaka, Japan

[21] Appl. No.: 450,554

[22] Filed: Dec. 16, 1982

[30] Foreign Application Priority Data

Jan. 25, 1982 [JP] Japan .................................. 57-9830

[51] Int. Cl.⁴ ........................... G01B 3/10; B43L 9/04
[52] U.S. Cl. ..................................... 33/138; 33/27 C; 33/189
[58] Field of Search ................ 33/138, 189, 27 C, 139

[56] References Cited

U.S. PATENT DOCUMENTS 2,842,853  7/1958  Hubbert ................................ 33/138
2,893,122  7/1959  Greco .................................. 33/27 C
3,148,455  9/1964  Aciego ................................. 33/189
3,262,211  7/1966  Beckett ............................. 33/138 X
3,731,389  5/1973  King .................................... 33/138
3,802,083  4/1974  Freed ................................... 33/138
4,015,337  4/1977  Taylor .................................. 33/138
4,296,554 10/1981  Hammerstrom ...................... 33/189

Primary Examiner—William D. Martin, Jr.
Attorney, Agent, or Firm—Wenderoth, Lind & Ponack

[57] ABSTRACT

A tape measure is provided with a marker. The marker may be contained in the tape measure case, mounted on the side of the case, or mounted on top of the case. In use, the marker is projected to mark a desired point on the surface being measured.

2 Claims, 5 Drawing Figures

TAPE MEASURE

BACKGROUND OF THE INVENTION

1. Field of the Invention

The present invention relates to an improved tape measure.

2. Description of the Prior Art

Conventionally, in measuring a distance on a surface, e.g. a wall, by means of a tape measure and putting a mark on the surface so as to indicate a desired point, it has been a common practice to set the scale mark 0 of the tape measure to one end of the distance with the left hand, draw out a desired length of the tape with the tape measure case held with the right hand, press the tape measure in the proximity of the desired scale mark with the left hand so as to prevent the tape measure from being pulled back into the tape measure case, release the tape measure case from the right hand, take out a pencil with the right hand, and put a mark on the surface in the position of the desired scale mark. This work has been done with inconvenience and low work efficiency because sometimes the work is done at a high level above the floor.

SUMMARY AND OBJECT OF THE INVENTION

It is an object of the present invention to provide a tape measure which obviates the above-described drawback and makes it possible to put a mark on a surface in the position of a desired scale mark with the right hand holding the tape measure case.

With this object in view, the invention will become apparent from the following detailed description, which will be more clearly understood in connection with the accompanying drawings.

DETAILED DESCRIPTION OF THE PREFERRED EMBODIMENTS

Figure 1:
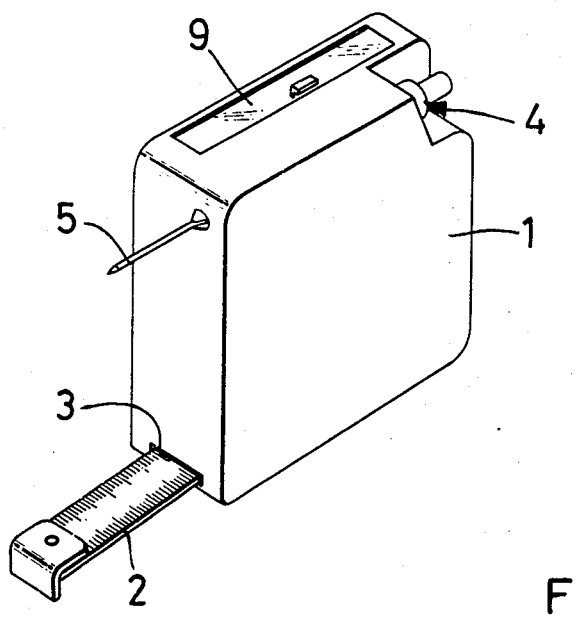
FIG. 1 is a perspective view of an embodiment of the present invention.

Referring now to FIG. 1, a tape measure in accordance with the present invention includes a tape 2 rolled in a substantially rectangular case 1 and adapted to be drawn out therefrom and pulled back thereinto through an opening 3 provided near the bottom. On top of the case 1 there is provided a marker unit 4 containing a marker 5 which is a mechanical pencil. Since it is of a well-known construction, we shall not describe it in detail. When a knob provided at rear of the marker unit 4 is pushed, the marker 5 will project in a direction parallel to the direction in which the tape 2 is pulled out. Beside the marker unit 4 there is a holder 9 for pencil leads.

Figure 2:
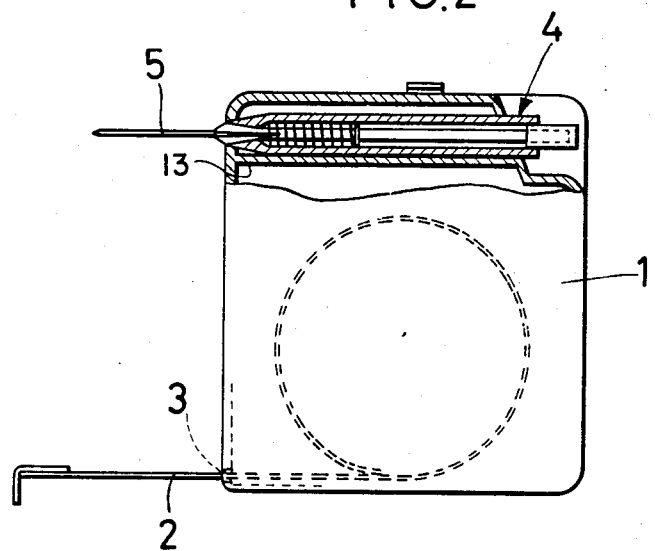
FIG. 2 is a partially cutaway vertical sectional view thereof.

As shown in FIG. 2, the marker 5 is spaced breadthwise from the center line of the top wall 13 of the case 1 so that, when the tip of the marker 5 is put on the surface of an article being measured, it is positioned not on the tape 2 but in close vicinity to its edge.

In the above-described embodiment, a mechanical pencil is used as the marker 5. However, a felt-tip marker, metal needle, chalk, etc. may also be used.

Figure 3:
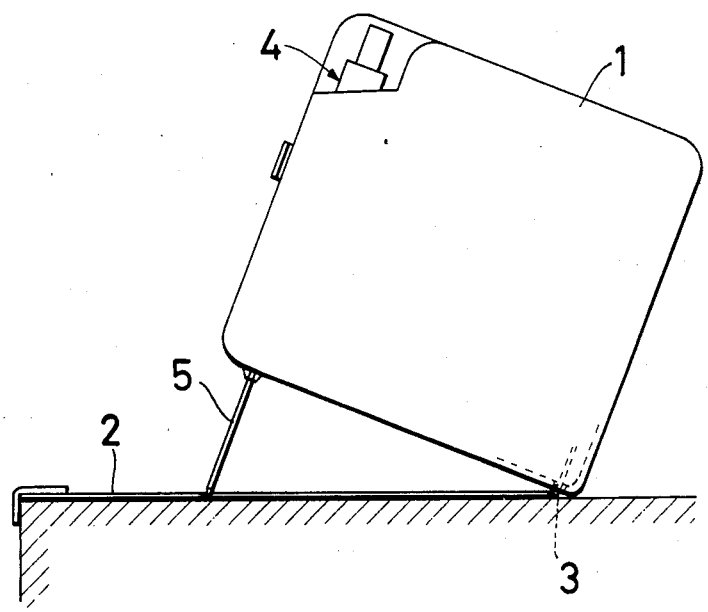
FIG. 3 is a side view of the same in use.

In operation, the marker 5 is allowed to project in the direction parallel to the direction in which the tape 2 is drawn out from the case 1 through the opening 3. This is effected by pushing the knob. Then a desired length of the tape 2 is drawn out, and the front corner edge of the bottom of the case 1 under the opening 3 is pressed so as to hold the tape 2 against the surface of the article being measured as shown in FIG. 3. When the rear corner edge of the bottom of the case 1 is manually rotated counterclockwise, a mark can be put thereon so as to indicate a desired point.

The tape measure in accordance with the present invention has an advantage in that it is handy to use and expedites accurate measurement because the marker 5, which is provided in a conventional tape measure, is adapted to project in the direction parallel to the direction in which the tape 2 is drawn out, thereby permitting a mark to be put on the surface of the article with the right hand holding the tape measure case 1.

Figure 4:
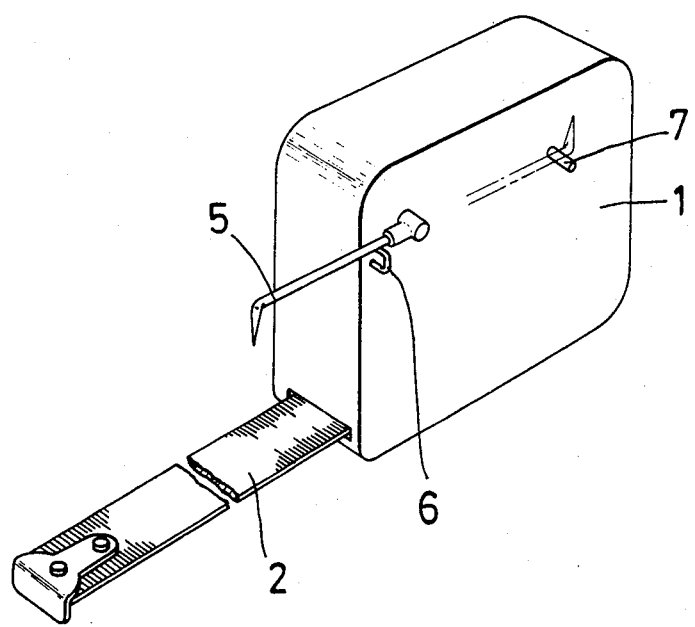
FIG. 4 is a perspective view of another embodiment.

Referring now to FIG. 4, the second embodiment of the present invention includes a marker 5 pivotally mounted on a lug 7 provided on one side of the case 1 so as to be turned around the lug 7. When the marker 5 is caught on a leaf spring 6, it extends in the direction in which the tape 2 is drawn out. When the marker 5 is out of use, it is allowed to rest on the lug 7.

Figure 5:
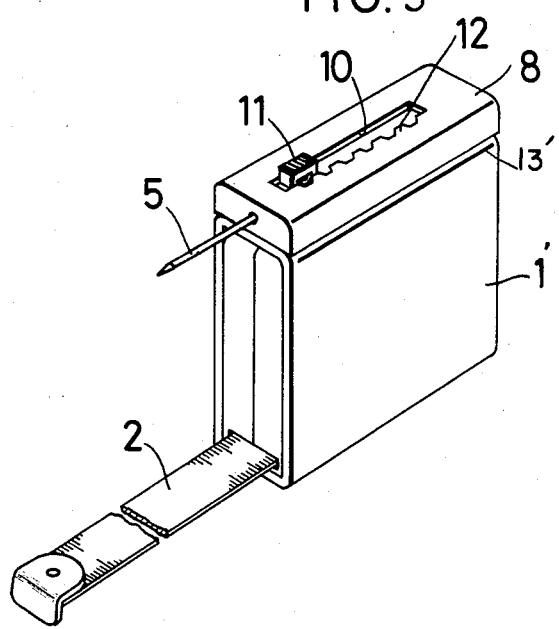
FIG. 5 is a perspective view of a further embodiment.

Referring now to FIG. 5, the third embodiment of the present invention includes a main case 1' and a marker case 8 which is mounted on a top wall 13' of the main case 1' and accommodates the marker 5. One of the longitudinal edges of a slit 10 provided in the top wall of the marker case 8 is formed with a plurality of recesses 12. A spring-loaded slide button 11 provided in the slit 10 is adapted to fit in one recess 12 after another when the button 11 is slid along the longitudinal edge of the slit 10. The marker 5 is secured to the leg of the slide button 11 so as to slide in and along the slit 10.

While a few embodiments of the present invention have been disclosed, it is to be understood that they are described by way of example only and not in a limiting sense, and the scope of the present invention is determined by the following claims.

What are claimed are:

1. A tape measure comprising:

a substantially rectangular case having a top wall with a front corner edge, a bottom wall with a front corner edge, and an opening in the front corner edge of the bottom wall, a tape being reeled in said case and capable of being drawn out through the opening in the front corner edge parallel to the bottom wall, and a marker mounted on and parallel to the top wall of said case for marking a point or line on a surface of an article being measured, said marker capable of being projected along the top wall of said case but spaced from and parallel to the bottom wall of said case;

whereby, upon manual rotation of the front corner edge of the top wall of the case toward the drawn out tape, when pressed against the surface of the article being measured, the marker is projected from the front corner edge along the top wall of said case and comes into contact with the surface of the article so that the measured distance along said surface is marked.

2. A tape measure for marking a distance along a surface of an article, comprising:
- a substantially rectangular main case having a top wall and a bottom wall, said top wall having a front corner edge,
- a tape reeled in said main case,
- a protective marker case mounted on and parallel to the top wall of said main case, and
- a marker mounted in said protective marker case so as to be parallel to but spaced from the bottom wall of said main case, said marker being projectable from the protective marker case in a direction parallel to the top wall of the main case,
- whereby, upon manual rotation of the front corner edge of the main case toward the drawn out tape, when pressed against the surface of the article being marked, the projectable marker is projected from the protective marker case and comes into contact with the surface of the article so that the distance measured along said surface of the article is marked.

* * * * *